Figure 1:
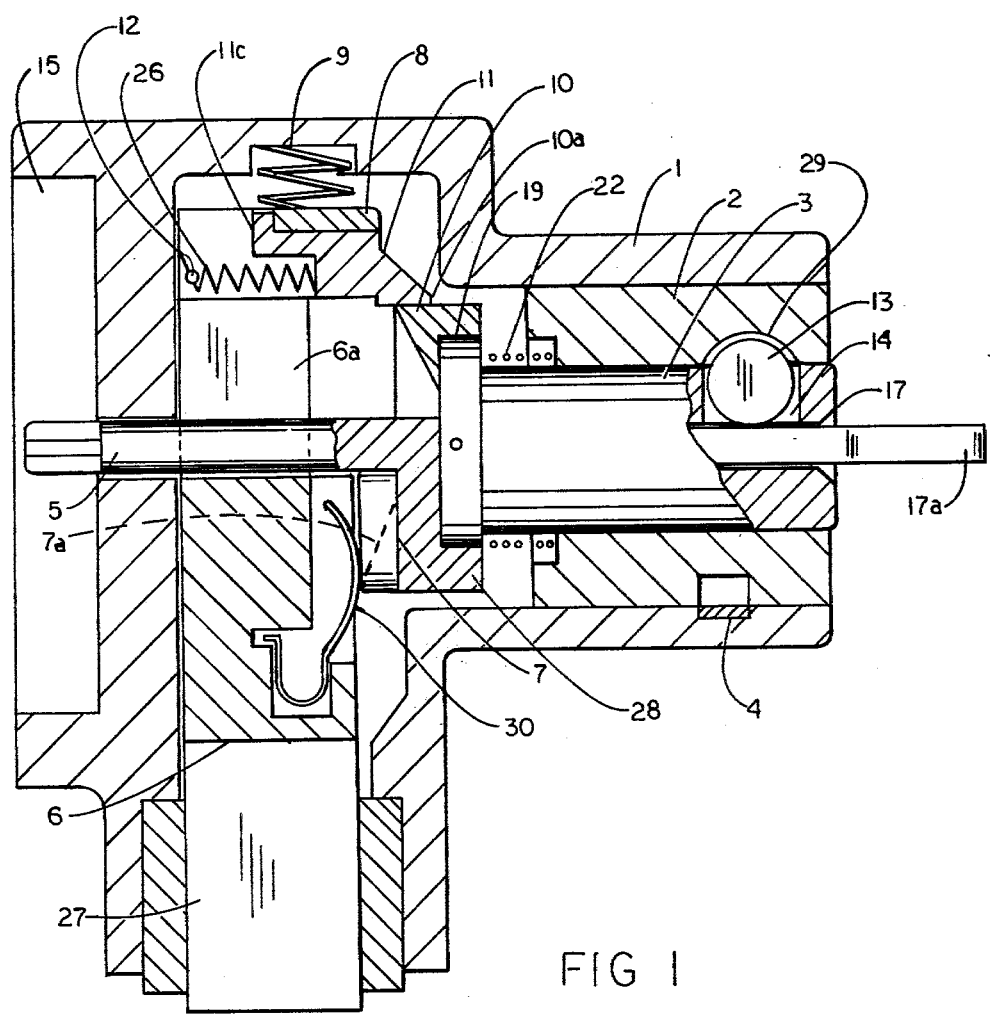

United States Patent [19]

Eichenauer

[11] 4,266,414
[45] May 12, 1981

[54] STEERING COLUMN AND IGNITION LOCK FOR MOTOR VEHICLE

[76] Inventor: Rudolf Eichenauer, Höllbergstrasse 1, D-6000 Frankfurt am Main, Fed. Rep. of Germany

[21] Appl. No.: 944,692

[22] Filed: Sep. 22, 1978

[30] Foreign Application Priority Data

Nov. 3, 1977 [DE] Fed. Rep. of Germany ....... 2749158

[51] Int. Cl.³ .............................................. B60R 25/02
[52] U.S. Cl. ........................................ 70/252; 70/360
[58] Field of Search .................. 70/252, 360, 186, 455

[56] References Cited

U.S. PATENT DOCUMENTS

| 3,590,611 | 7/1971 | Nakashima | 70/252 X |
| 3,877,265 | 4/1975 | Schaumberg | 70/360 X |
| 4,031,728 | 6/1977 | Eichenauer | 70/252 |

FOREIGN PATENT DOCUMENTS

| 1166641 | 3/1964 | Fed. Rep. of Germany | 70/186 |
| 2051111 | 4/1972 | Fed. Rep. of Germany | 70/252 |
| 2413876 | 10/1975 | Fed. Rep. of Germany | 70/252 |
| 2501479 | 7/1976 | Fed. Rep. of Germany | 70/360 |

Primary Examiner—Roy D. Frazier
Assistant Examiner—Carl F. Pietruszka
Attorney, Agent, or Firm—Kurt Kelman

[57] ABSTRACT

A coincidental lock for a motor vehicle comprises a key controlled lock cylinder mounted in the axial bore of a housing for axial displacement between an outward and an inward position, and for rotation in its inward position into selected operating positions. A lock bolt is mounted in a cross bore of the housing for displacement between a retracted and a locking position for the steering column of the vehicle. A spring biases the lock bolt into the locking position, and a latch member on the lock bolt maintains the lock bolt in the retracted position when the lock cylinder is in the inward position. A driving member operated by the rotation of the lock displaces the bolt against the spring bias into the retracted position and includes a control ring arranged for engagement with the latch member in the retracted position and carrying a cam projecting from the control ring towards the lock bolt. A leaf spring on the lock bolt cooperates with the cam to press the lock cylinder axially outwardly in a ready-to-lock position.

1 Claim, 2 Drawing Figures

STEERING COLUMN AND IGNITION LOCK FOR MOTOR VEHICLE

The present invention relates to improvements in a lock arrangement for a motor vehicle having a steering column. As is well known, combined steering column and ignition locks, also called coincidental locks, enable the steering column of a motor vehicle to be locked and unlocked simultaneously with the opening and closing of the ignition switch through actuation of a key controlled lock.

In my U.S. Pat. No. 4,031,728, dated June 28, 1977, I have disclosed a lock arrangement of this general type comprising a housing defining an axial bore and a cross bore intersecting therewith, a key controlled lock cylinder mounted in the axial bore of the housing for spring-biased axial displacement from an outwardly displaced position into an inwardly displaced position, and for rotation by the key about the axis of the bore in the inwardly displaced position into selected operating position, and a lock bolt mounted in the cross bore for displacement from a retracted position into a locking position upon removal of the key from the lock cylinder, causing the cylinder to assume the outwardly displaced position. Actuating means is arranged to displace the lock bolt between the retracted and locking positions, the bolt actuating means including an operating spring biased to displace the lock bolt into the locking position and a driving member operated by the rotation of the lock cylinder to displace the bolt against the bias of the operating spring into the retracted position. The bolt has a keeper engaging the steering column in the locking position and which is disengaged from the steering column in the retracted position. Latch means mounted on the lock bolt cooperates with the lock cylinder for maintaining the lock bolt in the retracted position when the lock cylinder is in the inwardly displaced position. When the ignition key is inserted in the keyhole of the lock cylinder and the cylinder is rotated to retract the bolt, the inwardly displaced cylinder holds the bolt in the retracted position by means of the latch means and the bolt is permitted to return to its locking position under the bias of the operating spring only when the key is withdrawn and the cylinder is in the outwardly displaced position.

It is the primary object of this invention to improve this lock arrangement by providing a simplified latch on the bolt permitting an outward bias to be exerted upon the lock cylinder temporarily in the retracted and ready-to-lock position of the lock bolt.

The above and other objects are accomplished according to the invention with the combination of a driving member including a control ring rotating and axially displaced with the lock cylinder, the control ring having periphery for engagement with the latch means in the retracted position of the lock bolt, a cam projecting from the control ring towards the lock bolt, and a leaf spring on the lock bolt, the leaf spring having one end seated in a recess in the lock bolt and another end extending towards the cam to press the lock cylinder axially outwardly in a ready-to-lock position of the lock bolt and the leaf spring being moved by the lock bolt out of contact with the cam when the bolt is moved into the locking position.

In this arrangement, the spring-biased pivotal latch maintaining the lock bolt in the retracted position in the lock arrangement of my prior patent is replaced by a simple leaf spring mounted in a recess in the lock bolt, thus simplifying the structure. The improved lock arrangement also saves control elements, such as pins and cooperating grooves, for controlling the rotation and displacement of the lock cylinder.

Figure 2:
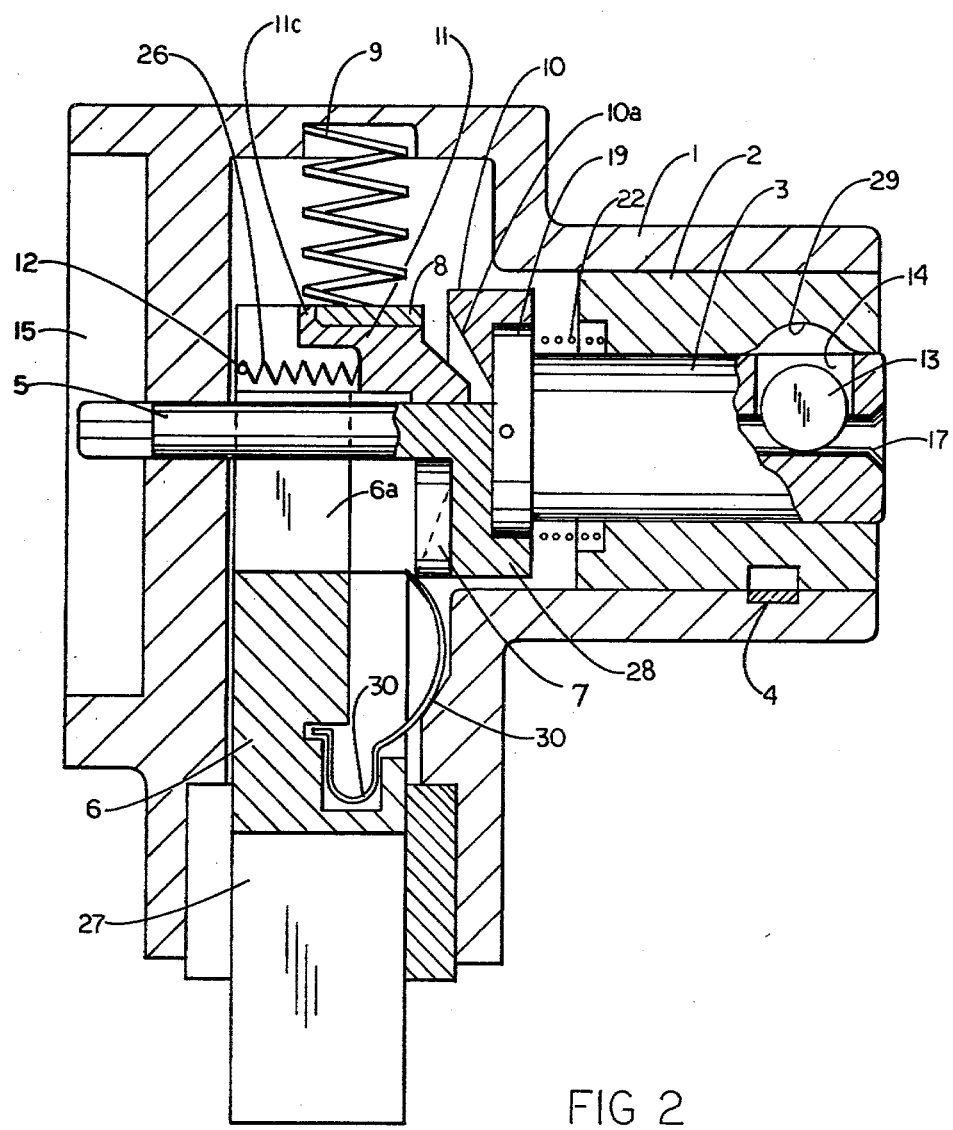

The above and other objects, advantages and features of the present invention will become more apparent from the following description of a now preferred embodiment, taken in conjunction with the accompanying drawing wherein FIG. 1 is an axial section of a steering lock according to this invention, with the lock cylinder and driver element in partial side elevational view, the key being inserted and the steering column lock bolt in a ready-to-lock, retracted position; and FIG. 2 is the same view as FIG. 1, with the key withdrawn and the lock bolt in locking position.

Referring now to the drawing, there is shown steering lock housing 1 defining an axial bore holding lock barrel 2 which, in turn, has an axial bore receiving lock cylinder 3 for axial displacement on withdrawal of key 17a into an outwardly displaced position from an inwardly displaced position, and for rotation by the key about the axis of the bore in the inwardly displaced position into selected operating positions. Driver element 5 extends axially from the inner end of lock cylinder 3 and carries an end portion for operating respective switches of an electrical operating circuit in switch box 15 of any conventional design for actuating the ignition and, if desired, other operations of the car.

Housing 1 also has a cross bore intersecting with the axial bore of the housing and retractible lock bolt 6 is slidably mounted in the cross bore for displacement from a retracted position (shown in FIG. 1), wherein steel tip or keeper 27 of the bolt is withdrawn from a matching recess in the steering column (not shown), and a locking position (shown in FIG. 2), wherein the keeper of bolt 6 engages the steering column recess and thus locks the steering column against movement. Since coincidental locks combining control of the steering column and ignition are well known, ignition circuitry 15 has not been further illustrated and described, nor has the steering column been shown in cooperation with its locking bolt. As illustrated, driver element 5 passes through elongated slot 6a in bolt 6 and through a bore in housing 1 to enable its end portion to operate circuitry 15.

The lock barrel and cylinder are held against unauthorized removal from housing 1 by leaf spring 4 in a generally known manner, all of the above structure and operation being substantially the same as, or equivalent to, those fully described and illustrated in my U.S. Pat. No. 4,031,728.

The inner end of lock cylinder 3 carries collar 19 and compression spring 22 is mounted between the collar and a recessed seat in lock barrel 2, spring means 22 being biased to displace the lock cylinder into the inwardly displaced position towards lock bolt 6 in the retracted position of the lock bolt (see FIG. 1).

With flat ignition key 17a removed and lock cylinder 3 in the OFF-position, coil spring 9, whose one end rests in a recessed seat in housing 1 while its other end presses against lock bolt 6, slides the lock bolt forwardly in the cross bore into a position wherein keeper 27 engages the keeper-receiving recess in the steering column and locks the same, i.e. from the position shown in FIG. 1 to that illustrated in FIG. 2. When it is desired to operate the motor vehicle, the ignition key is inserted into the keyhole of lock cylinder 3 and the cylinder is turned by the key from the OFF-position into a ready-for-driving position in a well known manner.

The lock arrangement comprises a driving member operated by the rotation of lock cylinder 3 to displace lock bolt 6 against the bias of operating spring 9 into the retracted position to disengage the keeper from the steering column. This driving member includes control ring 28 rotating and axially displaced with lock cylinder 3. Cam means is arranged eccentrically on control ring 28 and the cam means herein used comprises cam 7 and oblique camming face 10a.

Lock bolt 6 carries latch member 11 which constitutes a latch means cooperating with periphery 10 of control ring 28 for maintaining the lock bolt in the retracted position when the lock cylinder has been moved by inserted key 17a into the inwardly displaced position and the lock cylinder is turned into the driving position shown in FIG. 1 wherein periphery 10 subtends latch member 11. Latch member 11 may be a metallic casting or a synthetic resin piece and is mounted in projecting upper end 8 of the lock bolt which is open on top and at the bottom, latch member 11 having stop 11c projecting into the open top of the recess for engagement with a shoulder formed by the upper lock bolt end to prevent forward movement and removal of the latch member from the lock bolt recess. The latch member is forwardly biased by soft spring 26 whose forward end presses against latch member 11, thus tending to hold stop 11c in engagement with the shoulder, while the rear end of the spring is attached to pin 12 which prevents the latch member from being removed from its recess rearwardly.

When lock cylinder 3 is turned by ignition key 17a from the OFF-position, wherein the lock bolt is in the locking position (FIG. 2), to the driving position, the counterclockwise rotation of the lock cylinder and control ring 28 causes cam 7 to move under projecting upper end 8 of lock bolt 6 and to lift the lock bolt into its retracted position while attaining the driving position of the lock cylinder, i.e. from the FIG. 2 into the FIG. 1 position. While this rotary movement proceeds sequentially from the OFF-position to an intermediate position and then to the driving position, the oblique camming face 10a, which rises gradually, engages latch member 11 so as to move the latch member inwardly against the bias of spring 26. At the end of the turn, spring 26 biases the latch member outwardly so that the latch member extends above the periphery 10 of control ring 28 and lock bolt 6 is held in the retracted position.

Lock cylinder 3 defines an axial slot 17 for receiving ignition key 17a and radial slot 14 in communication with the axial slot. Wedge element 13, which is a disc in the illustrated embodiment, is mounted in radial slot 14 for sensing key 17a in the axial slot, housing 1 defining arcuate slot 29 concentrically surrounding a portion of the periphery of lock cylinder 3 and in communication with axial slot 14, the element extending into arcuate slot 29 when it is displaced thereinto by the insertion of key 17a. In the OFF-position, wedge element 13 extends into the axial slot or keyhole of the lock cylinder. When the key is inserted, its point will contact the wedge element and, upon further inward movement of the key in the keyhole, will slide element 13 radially outwardly out of the keyhole and into slot 29, as shown in FIG. 1. The arc of slot 29 is so dimensioned that wedge element 13 extending into this slot delimits the end positions of the rotary movements of lock cylinder 3. The segmental profile of slot 29, which conforms to the periphery of element 13, also delimits the axial displacement of the lock cylinder and holds the cylinder in its axial position. When key 17a is inserted, wedge element 13 firmly couples lock cylinder 3 to lock barrel 2 against axial displacement of the lock cylinder. Turning of the key will retract lock bolt 6 and engagement of control ring periphery 10 with projecting lock bolt end 8 will keep the bolt retracted against the firm bias of spring 9 in the driving position of the lock cylinder. Even when lock cylinder 3 is rotated into a position wherein cam 7 and bolt end 8 are no longer in engagement (ready-to-lock position of FIG. 1), lock bolt 6 will not be pressed into a steering column locking position, i.e. it will remain retracted, because spring-biased latch member 11 on lock bolt 6 is retained by control ring periphery 10.

According to the invention, leaf spring 30 has one end seated in a recess in lock bolt 6 and its other end is biased against cam 7 when the lock bolt is retracted (FIG. 1) to press lock cylinder 3 axially outwardly in the ready-to-lock position. In the locking position (FIG. 2), this bias is removed.

When the lock cylinder is turned clockwise from the driving position into the ready-to-lock position of FIG. 1, cam 7 is moved out of engagement with lock bolt 6 so that it can no longer hold it in its retracted position. Nevertheless, the lock bolt cannot move under the bias of spring 9 into its locking position shown in FIG. 3 because control ring periphery 10 is moved into subtending engagement with latch member 11 to hold the lock bolt against movement. As long as key 17a remains inserted in keyhole 17 in the ready-to-lock position of FIG. 1, wedge element 13 prevents any axial displacement of lock cylinder 3, as fully described in my abovementioned patent. When the key is withdrawn, wedge element 13 drops into keyhole 17 and, therefore, lock cylinder 3 is no longer coupled to lock barrel 2 and is free to be displaced axially, the pressure of spring 30 against cam 7 on control ring 28 causing lock cylinder 3 to be displaced axially outwardly against the bias of spring 22, which is weaker than that of spring 30 as lock bolt 6 moves into its locking position under the bias of spring 9. In the locking position shown in FIG. 2, return spring 22 moves lock cylinder 3 inwardly into its starting position so that the ignition key may be inserted in the keyhole without hindrance.

In the ready-to-lock position (FIG. 1), leaf spring 30 presses against lock cylinder 3 in the direction of the withdrawal of the key, the bias of loaded spring 30 exceeding the counter-pressure of spring 22. The displacement of the lock cylinder is prevented, however, until disc 13 can be radially displaced into recess 29 after the key has been withdrawn.

As shown in FIG. 2, when the lock bolt is in the locking position, leaf spring 30 simply rests in a recess in lock housing 1 and, thus, is without any effect on the lock cylinder.

The main advantage of leaf spring 30 resides in the fact that there is not outward axial pressure on lock cylinder 3 when the lock bolt is in the locking position since the leaf spring is no longer in contact with the lock cylinder in this position (see FIG. 2), having been moved down with lock bolt 6. Therefore, the lock cylinder can be readily inwardly displaced in this position, which is done automatically by spring 22 but, if desired, this spring could be omitted and the lock cylinder could simply be displaced inwardly by applying the tip of the key thereto before the key is inserted into the keyhole so as to place lock cylinder 3 into the axially inward position, in which it may be rotated into its various operating positions.

Obviously, leaf spring 30 need not be semi-circular, the leaf spring and cooperating cam 7 merely being shaped to cooperate suitably for biasing the leaf spring against control ring 28 when the lock bolt is retracted.

What is claimed is:

1. In a lock arrangement for a motor vehicle having a steering column, which comprises
   (a) a housing defining an axial bore and a cross bore intersecting therewith,
   (b) a key controlled lock cylinder mounted in the axial bore of the housing for spring-biased axial displacement from an outwardly into an inwardly displaced position, and for rotation by the key about the axis of the bore in the inwardly displaced position into selected operating positions including a driving position, a ready-to-lock position and a locking position,
      (1) the lock cylinder having an axial keyhole for inserting the key in one axial direction and withdrawing the key in the opposite axial direction,
   (c) a lock bolt mounted in the cross bore for displacement from a retracted position into a locking position upon withdrawal of the key from the keyhole in the opposite axial direction,
      (1) the bolt having a keeper engaging a recess in the steering column in the locking position,
   (d) spring means engaging the lock bolt and biased to displace the lock bolt into the locking position,
   (e) latch means mounted on the lock bolt and cooperating with the lock cylinder for maintaining the lock bolt in the retracted position when the lock cylinder is in the inwardly displaced position, and
   (f) actuating means arranged to displace the lock bolt between the retracted and locking positions, the bolt actuating means including
      (1) a driving member operated by the rotation of the lock cylinder to displace the bolt against the bias of the spring means into the retracted position to disengage the keeper from the steering column, the driving member including a control ring rotating and axially displaced with the lock cylinder, the control ring having a periphery for engagement with the latch means in the retracted position of the lock bolt, and a cam projecting from the control ring towards the lock bolt:
   (g) the improvement of a leaf spring having one end seated in a recess in the lock bolt and another end extending towards the cam, the leaf spring and the cam being arranged to press the lock cylinder axially outwardly in the ready-to-lock position and the leaf spring being moved by the lock bolt out of contact with the cam when the bolt is moved into the locking position.

* * * * *